United States Patent
Greubel et al.

(10) Patent No.: US 6,713,899 B1
(45) Date of Patent: Mar. 30, 2004

(54) LINEAR SYNCHRONOUS MOTOR

(75) Inventors: Klaus Greubel, Bad Neustadt (DE); Axel Knauff, Münnerstadt (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 09/720,709

(22) PCT Filed: Jun. 16, 1999

(86) PCT No.: PCT/DE99/01765

§ 371 (c)(1),
(2), (4) Date: Jan. 18, 2001

(87) PCT Pub. No.: WO00/01059

PCT Pub. Date: Jan. 6, 2000

(30) Foreign Application Priority Data

Jun. 29, 1998 (DE) .......................... 198 29 052

(51) Int. Cl.$^7$ ............................................. H02K 41/03
(52) U.S. Cl. ............................................. 310/12
(58) Field of Search ............................... 310/12, 13, 14; 318/135

(56) References Cited

U.S. PATENT DOCUMENTS

| 4,908,533 A | 3/1990 | Karita et al. | ............... 310/12 |
| 4,912,746 A * | 3/1990 | Oishi | ............... 310/12 |
| 5,744,879 A | 4/1998 | Stoiber | ............... 310/12 |

FOREIGN PATENT DOCUMENTS

| DE | 37 22 153 A1 * | 1/1989 |
| EP | 0 334 645 A1 | 9/1989 |
| JP | 55 068871 A | 5/1980 |
| JP | 59 185154 A | 10/1984 |
| JP | 62 203549 A | 9/1987 |
| JP | 5-103457 * | 4/1991 |
| JP | 03 207256 A | 9/1991 |
| JP | 04 281359 A | 10/1992 |
| JP | 05 103457 A | 4/1993 |
| JP | 08 331833 A | 12/1996 |
| JP | 9-74733 A * | 3/1997 |
| JP | 09 074733 A | 3/1997 |
| JP | 09 247921 A | 9/1997 |
| WO | WO 96 27940 A | 9/1996 |

OTHER PUBLICATIONS

Translation of JP 9–074733.*
Translation of JP 5–103457.*

* cited by examiner

Primary Examiner—Karl Tamai
Assistant Examiner—Judson H. Jones
(74) Attorney, Agent, or Firm—Henry M. Feiereisen

(57) ABSTRACT

In order to suppress virtually completely the cyclic power variation of a linear synchronous motor, the latter has the following features. At least one primary part (1) and at least one secondary part (6), which has a sequence of poles (10) formed by permanent magnets, and is also larger than the length of the primary part (1) in the movement direction (5). The primary part (1) has primary slots (9) which are suitable for receiving monophase or polyphase windings. Moreover, the primary part (1) has means for changing the magnetic force in the movement direction (5) of the linear motor in the region of the end piece (2) of the primary part (1). The end faces (14) of the end pieces (2) extend perpendicular to the movement direction (5) of the linear motor.

12 Claims, 4 Drawing Sheets

LINEAR SYNCHRONOUS MOTOR

BACKGROUND OF THE INVENTION

The invention relates to a linear synchronous motor.

Synchronous motors which are used as actuating motors should develop power in a way which is as uniform and free from interference as possible.

In the case of rotary synchronous motors, it is essentially the slotting of the stator which comes into consideration for causing periodic power fluctuations, also generally termed cyclic power variation. In order to compensate this cyclic power variation and other further effects, caused by the slotting, on the torque at the drive shaft, the rotor and/or stator poles are usually skewed over the width of a slotting.

It is also known, from U.S. Pat. No. 4,908,533, in the case of linear synchronous motors to bevel the poles over the width of a slot of the wound primary part in order to avoid the cyclic power variation. Since the edges of the end faces of the primary part run parallel to its slots in plan view, skewing results at the front and rear end edges of the poles in the case of the known slot skewing.

A further possibility, known from EP 0 334 645 A1, for reducing the cyclic power variation consists in designing the core of the primary part of a linear synchronous motor as a ferromagnetic plate, and arranging coils in the air gap of the linear motor such that the end regions of the plate project over the air gap coils and form a step in the region of the longitudinal mid line of the linear motor.

Unlike the rotary synchronous motors, which continue endlessly viewed in the circumferential direction, a linear synchronous motor has, as a particular feature, a start and an end. In the case of a linear synchronous motor, periodic motor end forces, which can have a disturbing effect on the continuous movement of the linear motor, are produced in the direction of movement at the transitions at the start and at the end.

The motor end forces are produced because the linear motor covers the magnetic poles differently depending on the motor position. There are preferred positions in this case, in which the stored magnetic energy of the linear motor is particularly high. An additional expenditure of force is required to move the linear motor out of such preferred positions. There is a preferred position over each magnet pole.

The pole force therefore varies periodically in relation to the magnet poles, and this leads to a disturbance in the motor power which is denoted as cyclic pole variation. Since the pole force is not a function of the motor current, it constitutes a passive force which is also present in the de-energized state. The pole force does not perform any work, since it acts alternately in the direction of movement and against the direction of movement of the linear motor. In operation, it is added to the force produced by the motor current. The pole force has nothing in common with the slot force with which the magnet pole edges and the stator slots act on one another.

The cyclic pole variation described leads to inaccurate movement of conventional linear synchronous motors, and this is particular undesirable when these motors are used as precision actuators.

SUMMARY OF THE INVENTION

Consequently, it is an object of the invention is to provide a linear synchronous motor which is capable to virtually completely suppress the cyclic power variation.

According to the invention, this object is achieved by means of a linear synchronous motor having the following features:

at least one primary part and at least one secondary part, the secondary part has a series of poles formed by permanent magnets, the length of the secondary part is greater than the length of the primary part in the direction of movement, the primary part has slots which are suitable for holding monophase or polyphase windings, the primary part has means which lead to a change in the magnetic force in the direction of movement of the linear motor in the region of the end pieces of the primary part, and the end faces of the end pieces extend perpendicular to the direction of movement of the linear motor.

In the linear synchronous motor according to the invention, the air gap is formed in the region of the end pieces of the primary part in such a way that it varies from section to section. The end faces of the end pieces are designed in parallel and perpendicular to the direction of movement in each case. The cyclic power variation is substantially reduced hereby while yet maintaining the compact design of the linear synchronous motor virtually unchanged.

The air gap of the end pieces is formed in a further embodiment in such a way that the change in the magnetic force on the end pieces is continuous in the case of a relative movement of the primary and secondary parts. Because of the formation of the end pieces of the primary part in accordance with the invention, for each pole force contribution at the front side of the linear motor there is exactly one pole force contribution of equal and opposite magnitude at the rear side of the linear motor. The formed end pieces of the primary part are preferably not slotted and wound.

In a further embodiment, the parts of the end pieces of the primary part, that face the air gap, have a geometry which is selected in accordance with the following relationship, $$y(x) = \delta_0 \left[ \frac{1}{\sqrt{1 - \frac{x}{x_0} \cdot \left[1 - \left(\frac{1}{1 + \frac{y_0}{\delta_0}}\right)\right]}} - 1 \right]$$

wherein $\delta_0$ is the magnetically active air gap between the secondary part and the primary part, including the height of the permanent magnets, $x_0$ is the extent of the part of the end piece in the direction of movement of the linear motor having a non-constant air gap, $y_0$ is a height of the part of the end piece having a non-constant air gap at $x_0$ and, $y(x)$ is the coordinate of the part of the end piece having a non-constant air gap at the point x.

In this case, the magnetic force on the end pieces decreases and increases linearly in the case of relative movement of the primary part and secondary part. The length of the end pieces in the direction of movement of the linear motor can thereby be kept short, so that the spatial extent of the primary part can be limited to the dimensions most necessary. The parameters are preferably selected as $\delta_0 = 5$ mm, $x_0 = 5$ mm and $y_0 = 4.2$ mm.

In a further embodiment, the gaps, located between the poles, of the secondary part exhibit an angle differing from 90° with respect to the direction of movement of the linear motor. In the following, the term "pole" will be understood as an arrangement of, for example, at least one permanent magnet which has a north pole and a south pole. The skewing is preferably selected in the region of the width of a slot of the primary part. The pole skewing is to be increased or to be decreased together with the end piece forming of the primary part, depending on the selection of the parameters in accordance with the above relationship with reference to the profile of the end piece.

In a further embodiment, the gaps located between the poles are designed essentially perpendicular to the movement direction, but have different gap widths so as to further contribute to the reduction of the cyclic power variation also in this case.

The gap widths are to be enlarged or reduced together with end piece formation of the primary part, depending on how the parameters are selected in accordance with the above relationship with reference to the profile of the end piece.

In a further embodiment, the stack of ferromagnetic laminations is subdivided into several partial stacks of laminations extending perpendicular to the direction of movement of the linear motor, in order to optimize assembly and stockholding.

The formed end pieces of the primary part can preferably be produced separately and fitted on the primary part such that, depending on the primary part and intended use, the end pieces as such can be produced and assigned to the respective primary part. All known positive and non-positive types of connections can hereby be used.

BRIEF DESCRIPTION OF THE DRAWING

The invention and further advantageous refinements of the invention in accordance with features of the subclaims are now explained in more detail with reference to exemplary embodiments shown schematically in the drawing, in which:

DETAILED DESCRIPTION OF PREFERRED EMBODIMENTS

Figure 1:
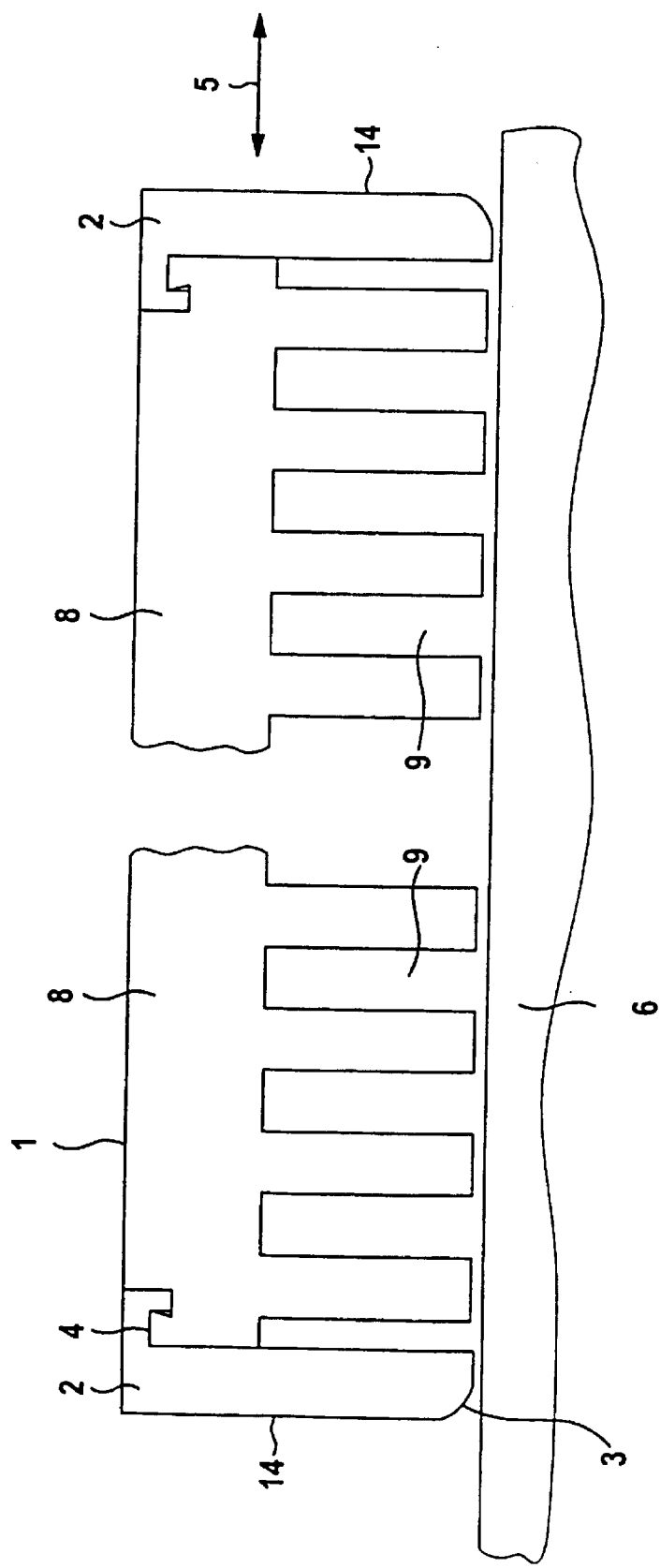
FIG. 1 shows a side view of a linear motor.

FIG. 1 shows a side view of a linear synchronous motor according to the invention, typically including a primary part 1 and a secondary part 6. For reasons of clarity, an illustration of poles 10 has been omitted in FIG. 1. The direction of movement of the linear motor is indicated by an arrow 5. The length of the primary part 1 in the movement direction 5 is shorter than the length of the secondary part 6. The primary part 1 includes a layered stack 8 of laminations 8 with primary part slots 9 which extend in parallel relationship for allowing placement of windings which are electrically excited by monophase or polyphase alternating current. Prefabricated field coils have proved to be particularly easy to assemble in this case. In the exemplary embodiment according to FIG. 1, the longitudinal axes of the primary part slots 9 extend perpendicular to the longitudinal axis of the primary part 1, i.e. perpendicular to the movement direction 5. Skewed primary part slots 9 are also conceivable.

Figure 2:
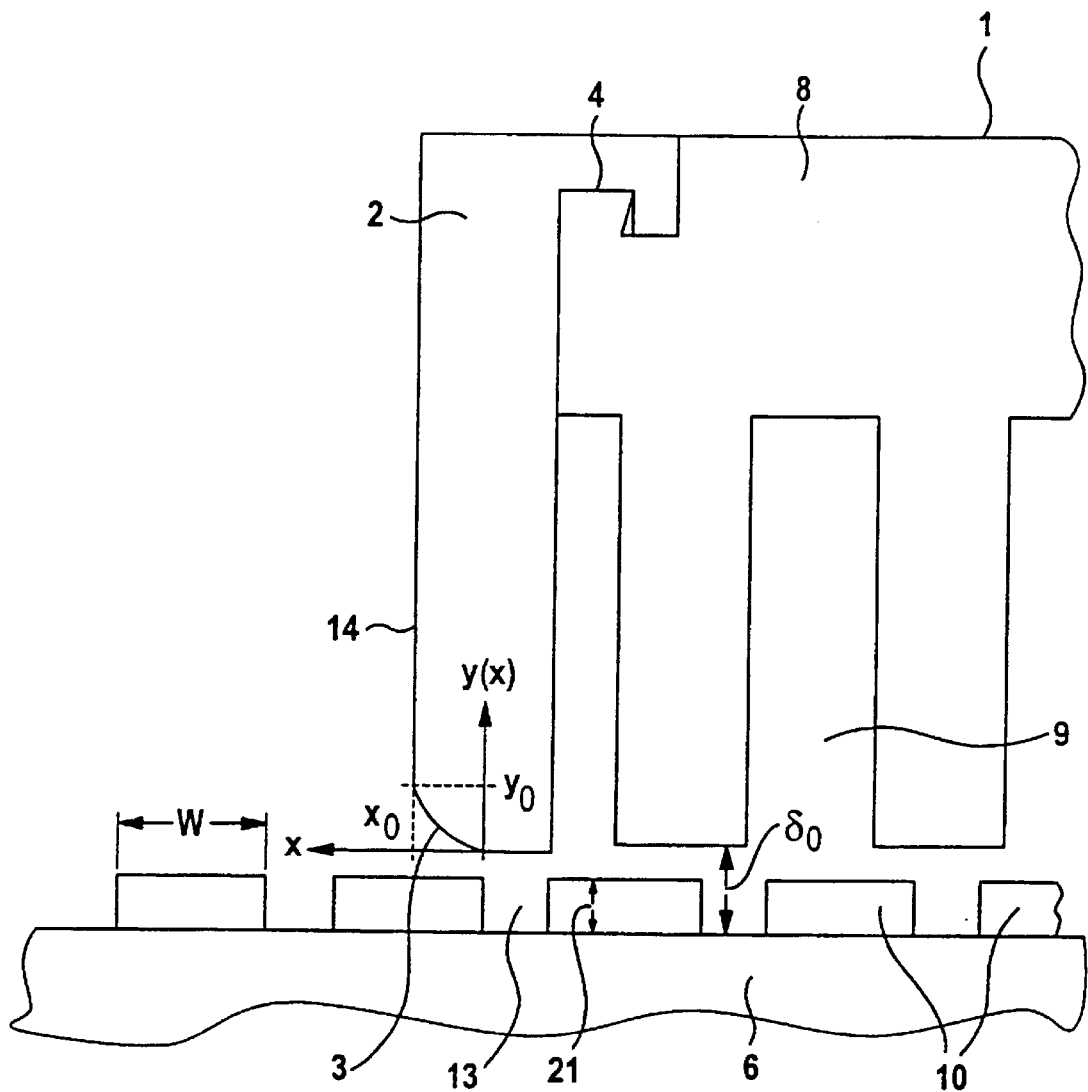
FIG. 2 shows an enlarged illustration of a detail of the side view of a linear motor.

The stationary secondary part 6 includes a multiplicity of poles 10 which are arranged sequentially in the movement direction, with each one having a north pole 11 and a south pole 12. A narrow pole gap 13 of gap width P is located between the poles 10 which have each a width of W. In the exemplary embodiment according to FIG. 1 and FIG. 2, the longitudinal axes of the pole gaps 13 extend perpendicular to the longitudinal axis of the primary part 1, and are therefore orientated in the same way as the longitudinal axes of the primary part slots 9 according to FIG. 1. When the winding in a primary part 1 is excited, a force is produced which moves the primary part 1, which, for example, is fastened under a slide, relative to the stationary secondary part 6. The speed of the primary part 1 is hereby synchronous with respect to the frequency of the two-phase or three-phase alternating voltage for exciting the primary part 1. This is the reason for designating this linear type as a linear synchronous motor.

According to the invention, the end regions 14 of the stack 8 of laminations of the primary part 1 are of unslotted design; and in order to achieve a constant force profile of a magnet pole, the end pieces 2 of the primary part 1 are designed in accordance with the relationship $$y(x) = \delta_0 \left[ \frac{1}{\sqrt{1 - \frac{x}{x_0} \cdot \left[1 - \left(\frac{1}{1 + \frac{y_0}{\delta_0}}\right)\right]}} - 1 \right]$$

wherein $\delta_0$ is the magnetically active air gap between the secondary part and the primary part, including the height 21 of the permanent magnets, $x_0$ is the extent of the part 3 of the end piece 2 in the direction 5 of movement of the linear motor having a non-constant air gap, $y_0$ is a height of the part 3 of the end piece 2 having a non-constant air gap at $x_0$ and, $y(x)$ is the coordinate of the part 3 of the end piece 2 having a non-constant air gap at the point x.

Figure 5:
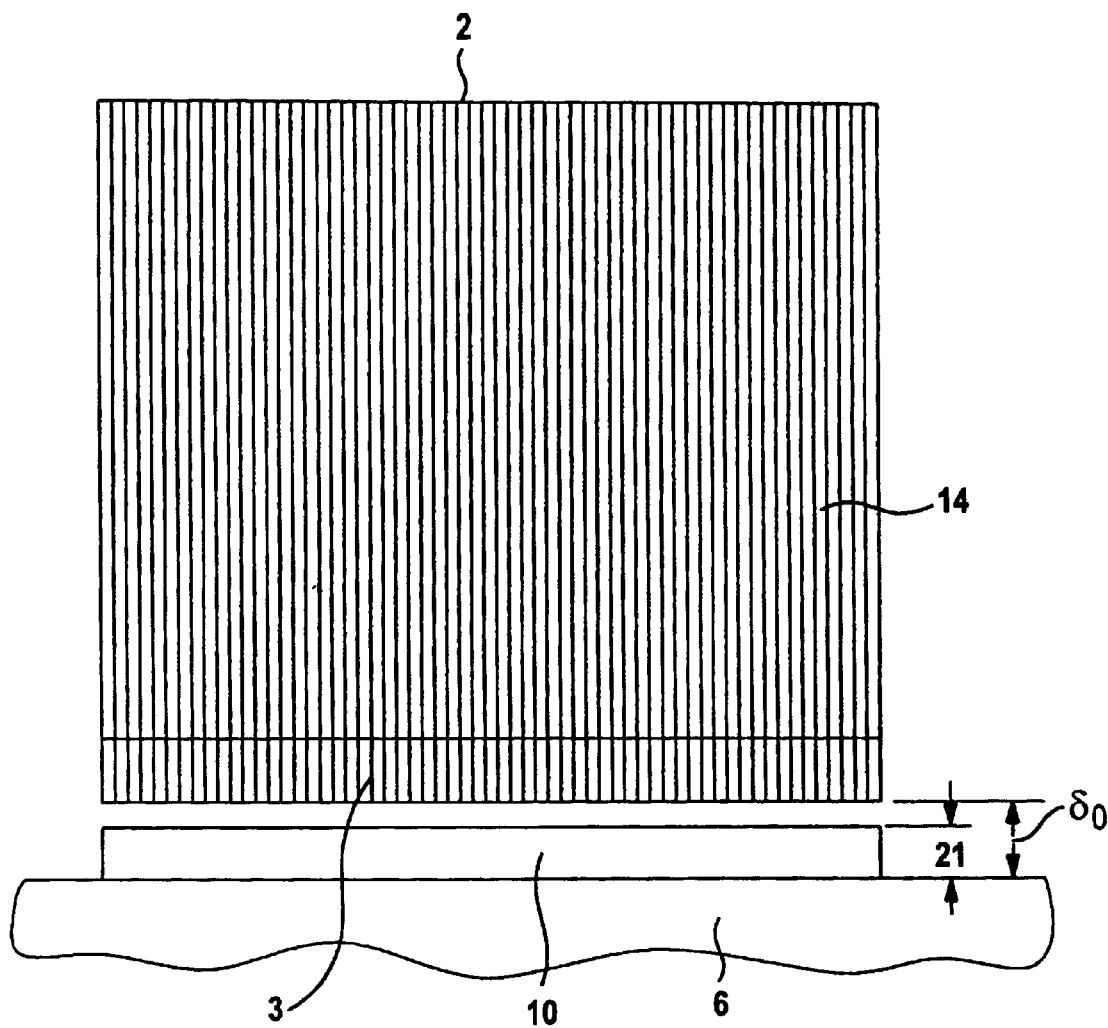
FIG. 5 is an end view of a modified linear motor according to the present invention.

The formed end pieces 2 may form a part of the stack 8 of laminations, but may also be attached as individual formed parts to the original stack 8 of laminations so that the stack of laminations can be fabricated in a conventional way with primary part slots 9 and windings, and subsequently provided with the end pieces 2. The orientation of the laminated arrangement preferably corresponds to the orientation of the stack 8 of laminations. The end formed pieces 2 are connected to the stack 8 of laminations in a non-positive or positive manner 4. FIG. 5 shows the end pieces 2 to include at least one partial stack of laminations made of ferromagnetic material and directed essentially perpendicular to the direction of movement 5 of the linear motor.

Figure 3:
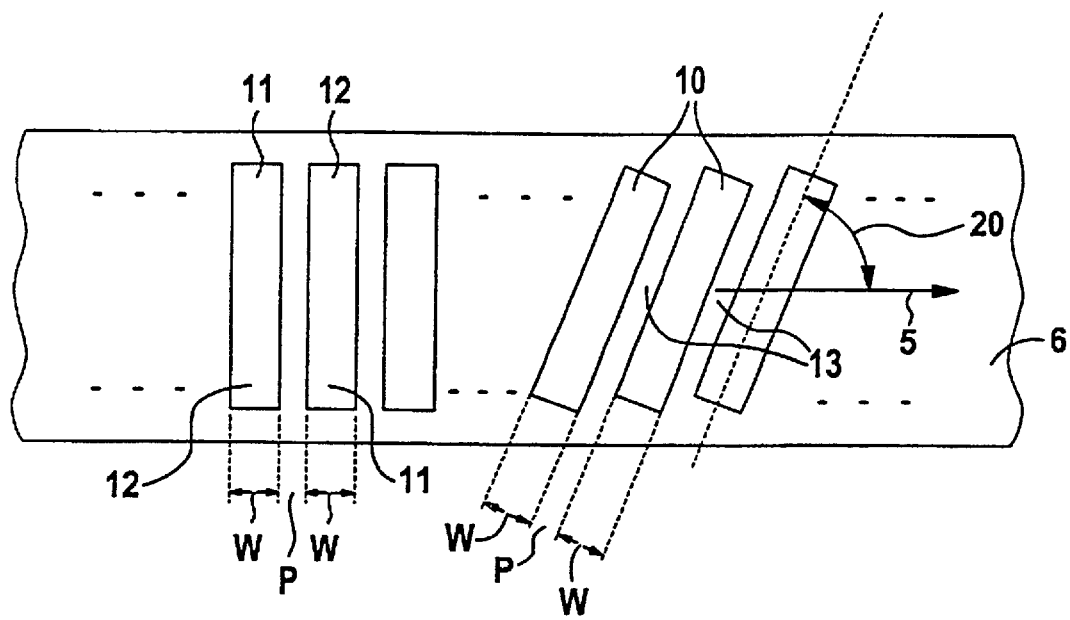
FIGS. 3, 4 show arrangements of permanent magnets of the secondary part.
Figure 4:
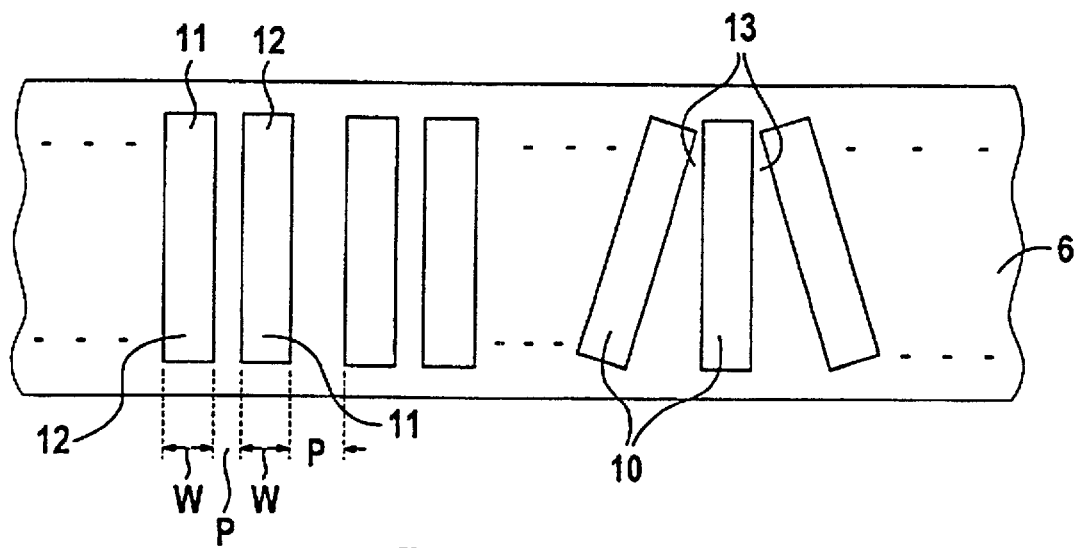

In the further exemplary embodiments of the linear synchronous motor according to the invention, as illustrated in FIGS. 3 and 4, the longitudinal axes of the poles 10 of the secondary part 6 are skewed at an angle of 20 to the movement direction 5 in order to compensate the slot-induced cyclic power variation. This skewing of the poles 10 correlates with the formation of the end piece 2 of the primary part 1 such that a more or less pronounced skewing of the longitudinal axes of the poles 10 relative to the movement direction 5 may be required in order to obtain optimum compensation of the cycle power variation. It goes without saying that the skewing of the longitudinal axes of the primary part slots 9 in accordance with FIG. 4, and a variation in the pole gaps 13 between the poles 10 in accordance with FIG. 3 can also be jointly applied.

It is further possible to vary the configuration of the pole gaps 13 of obliquely arranged poles 10. Moreover, pole gaps 13 can also be aligned conically.

It is also possible to use poles 10 of different width W, whereby the individual poles 10 may also be formed from several permanent magnets.

Different poles 10 and pole gaps 13 can be formed by staggering these permanent magnets, which can also be of different design.

Permanent magnets of virtually any desired spatial formulation (for example different height 21, width W and length) can be used in order further to compensate the cyclic power variation.

What is claimed is:

1. A linear synchronous motor comprising:
   a) at least one primary part (1) and at least one secondary part (6);
   b) the secondary part (6) has a sequence of poles (10) formed by permanent magnets;
   c) the length of the secondary part (6) is greater than the length of the primary part (1) in the movement direction (5),
   d) the primary part (1) has primary part slots (9) which are suitable for holding monophase or polyphase windings,
   e) the primary part (1) has means which lead to a change in the magnetic force in the movement direction (5) of the linear motor in the region of the end pieces (2) of the primary part (1), and
   f) the end faces (14) of the end pieces (2) extend perpendicular to the movement direction (5) of the linear motor,
      wherein the air gap between the end pieces (2) and the part (6) changes gradually within a single pole pitch so as to realize a continuous increase or decrease in the magnetic force in the movement direction (5) of the linear motor in the region of the end pieces (2) of the primary part (1), wherein the geometry of the parts, facing the air gap, of the end pieces (2) is selected in accordance with the following relationship:

$$y(x) = \delta_0 \left[ \frac{1}{\sqrt{1 - \frac{x}{x_0} \cdot \left[1 - \left(\frac{1}{1 + \frac{y_0}{\delta_0}}\right)\right]}} - 1 \right]$$

wherein
   $\delta_0$ is the magnetically active air gap between the secondary part and the primary part, including the height of the permanent magnets,
   $x_0$ is the extent of the part of the end piece in the direction of movement of the linear motor having a non-constant air gap,
   $y_0$ is a height of the part of the end piece having a non-constant air gap at $x_0$ and,
   $y(x)$ is the coordinate of the part of the end piece having a non-constant air gap at the point x.

2. The linear synchronous motor as claimed in claim 1, characterized in that the gaps (13), located between the poles (10), of the secondary part (6) exhibit an angle (20) which differs from 90° with respect to the movement direction (5) of the linear motor.

3. The linear synchronous motor as claimed in claim 1, characterized in that the gaps (13) located between the poles (10) have a varying gap width (P).

4. The linear synchronous motor as claimed in claim 1, characterized in that the end pieces (2) include at least one partial stack of laminations made of ferromagnetic material, said laminations directed essentially perpendicular to the direction of movement (5) of the linear motor.

5. The linear synchronous motor as claimed in claim 1, characterized in that the end pieces (2) are configured for attachment onto the primary part (1).

6. The linear synchronous motor as claimed in claim 1, characterized in that the end pieces (2) of the primary part (1) are constructed in the absence of slots and without carrying a winding.

7. A linear synchronous motor comprising:
   at least one primary part defined by a length and having slots for receiving monophase or polyphase windings, said primary part having end pieces extending perpendicular to a direction of movement of the linear motor;
   at least one secondary part having a series of poles formed by permanent magnets, said secondary part defined by a length which is greater than the length of the primary part in a direction of movement of the linear motor; and means, associated to the primary part, for changing the magnetic force in the direction of movement of the linear motor in the region of the end pieces of the primary part,
   wherein an air gap between the end pieces and the secondary part changes gradually within a single pole pitch so as to realize a continuous increase or
   decrease in the magnetic force in the movement direction of the linear motor in the region of the end pieces of the primary part,
   wherein each said end piece has a part adjacent the air gap, said part of the end piece having a geometry selected in accordance with the following relationship:

$$y(x) = \delta_0 \left[ \frac{1}{\sqrt{1 - \frac{x}{x_0} \cdot \left[1 - \left(\frac{1}{1 + \frac{y_0}{\delta_0}}\right)\right]}} - 1 \right]$$

wherein
   $\delta_0$ is the magnetically active air gap between the secondary part and the primary part, including a height of the permanent magnets,
   $x_0$ is the extent of the part of the end piece in the direction of movement of the linear motor having a non-constant air gap,
   $y_0$ is a height of the part of the end piece having a non-constant air gap at $x_0$ and,
   $y(x)$ is the coordinate of the part of the end piece having a non-constant air gap at the point x.

8. The linear synchronous motor of claim 7, wherein a pole gap is defined between neighboring poles of the secondary part at an angle which differs from 90° with respect the direction of movement of the linear motor.

9. The linear synchronous motor of claim 8, wherein the pole gap has a varying gap width.

10. The linear synchronous motor of claim 8, wherein the end pieces include at least one partial stack of laminations, which is made of ferromagnetic material, said laminations directed essentially perpendicular to the direction of movement of the linear motor.

11. The linear synchronous motor of claim 8, wherein the end pieces are configured for attachment onto the primary part.

12. The linear synchronous motor of claim 8, wherein each said end pieces is constructed in the absence of a slot and without carrying a winding.

* * * * *